(12) United States Patent
Oishi et al.

(10) Patent No.: US 7,946,941 B2
(45) Date of Patent: May 24, 2011

(54) BICYCLE OUTER CHAIN LINK

(75) Inventors: Toshinari Oishi, Sakai (JP); Yusuke Nishimoto, Sakai (JP)

(73) Assignee: Shimano Inc., Osaka (JP)

( * ) Notice: Subject to any disclaimer, the term of this patent is extended or adjusted under 35 U.S.C. 154(b) by 927 days.

(21) Appl. No.: 11/600,182

(22) Filed: Nov. 16, 2006

(65) Prior Publication Data

US 2008/0119312 A1   May 22, 2008

(51) Int. Cl.
*F16G 13/06* (2006.01)

(52) U.S. Cl. .................. 474/206; 474/230; 474/231

(58) Field of Classification Search .......... 474/206, 474/212, 213, 215, 230, 231; 59/4, 5, 78, 59/84

See application file for complete search history.

(56) References Cited

U.S. PATENT DOCUMENTS

| 4,328,665 | A | * | 5/1982 | Taubert et al. | ...... 59/88 |
| 4,596,539 | A | | 6/1986 | Yamasaki | |
| 5,098,349 | A | * | 3/1992 | Wu | ...... 474/206 |
| 5,226,857 | A | | 7/1993 | Ono et al. | |
| 5,362,282 | A | * | 11/1994 | Lickton | ...... 474/220 |
| 5,465,568 | A | * | 11/1995 | Wang | ...... 59/4 |
| 5,741,196 | A | | 4/1998 | Campagnolo | |
| 6,171,209 | B1 | * | 1/2001 | Matsuda | ...... 474/213 |
| 7,267,220 | B2 | * | 9/2007 | Wang | ...... 198/850 |
| 7,325,391 | B1 | * | 2/2008 | Oishi et al. | ...... 59/5 |
| 2005/0020394 | A1 | | 1/2005 | Valle | |
| 2005/0202914 | A1 | * | 9/2005 | Reiter et al. | ...... 474/206 |

FOREIGN PATENT DOCUMENTS

DE    101 27 139 A1   1/2003
JP    2005-001659      1/2005

* cited by examiner

*Primary Examiner* — Robert A Siconolfi
*Assistant Examiner* — Vu Q Nguyen
(74) *Attorney, Agent, or Firm* — Global IP Counselors, LLP

(57) ABSTRACT

An outer chain plate is configured to aid in downshifting such that a chain moves more smoothly from an outer chain ring (sprocket) to an inner chain ring (sprocket) with either no downshifting recess being provided on the outer chain ring or at least a shallower than normal downshifting recess being provided on the outer chain ring. At least a bottom part of the outer chain plate that faces a center axis of a sprocket when in use has a portion removed to minimize contact with outer chain ring when downshifting. Preferably, the bottom part of the outer chain plate has a chamfered outer edge portion along a cutout portion that defines a reduced area portion.

14 Claims, 13 Drawing Sheets

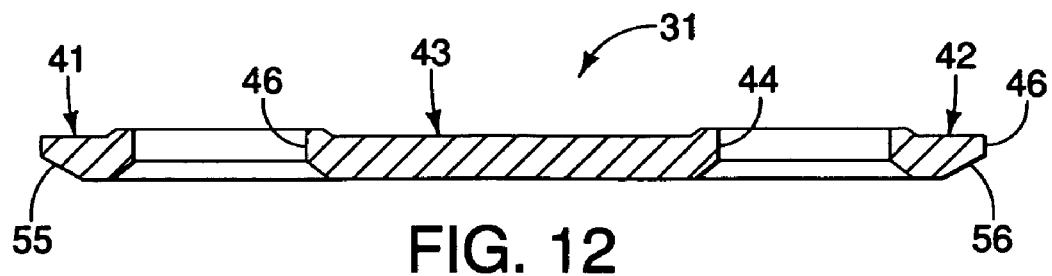
FIG. 12
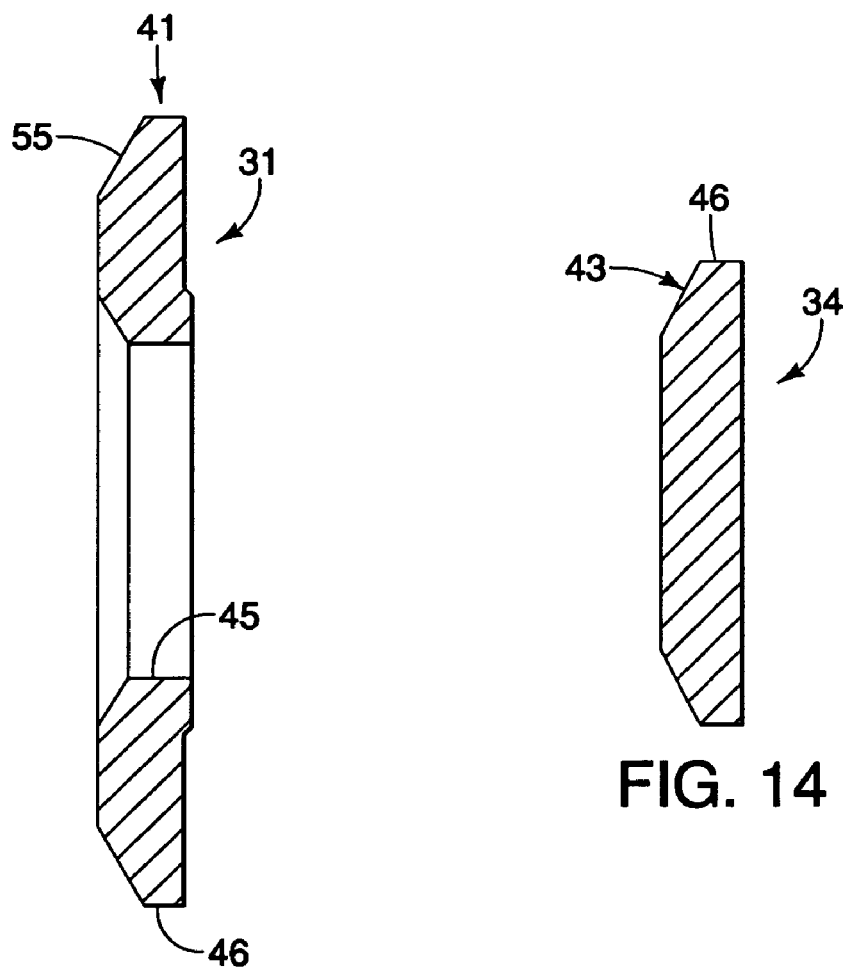
FIG. 13
FIG. 14

BICYCLE OUTER CHAIN LINK

BACKGROUND OF THE INVENTION

1. Field of the Invention

This invention generally relates to bicycle chains. More specifically, the present invention relates to an outer link for a bicycle chain.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is the bicycle chain.

Most bicycles have a drive train that uses a chain to transmit the pedaling action from the rider to the rear wheel. Bicycle chains have a plurality of inner links and a plurality of outer links that are interconnected in an alternating manner by a plurality of pins. Typically, each of the inner links includes a pair of parallel inner plates connected by a pair of parallel hollow cylinders or pins surrounded by cylindrical rollers. Each of the outer pin links includes a pair of parallel outer plates connected by the pins of the adjacent inner links. In order to form a single continuous chain, two of the inner links are connected together by a releasable connecting link, which is often called a master chain link. Examples of bicycle chains with a master link are disclosed in U.S. Pat. No. 5,362,282 to Lickton, U.S. Pat. No. 6,110,064 to Guichard, and U.S. Patent Publication No. 2002/0173395A1 to Reiter et al. Other examples of bicycle chains are disclosed in U.S. Pat. No. 5,741,196 to Campagnolo and U.S. Patent Publication No. 2005/0020394A1 to Valle.

When downshifting a chain from a large front chain ring to a smaller chain ring, the outer links of the chain sometime tend to contact the inside surface of the large front chain ring. Thus, some bicycle cranksets have been provided with downshifting recesses or indentations on the inside surface of the large front chain ring to aid in the downshifting from. While this arrangement works well. The manufacturing process for forming such a bicycle crankset requires additional manufacturing steps that can increase the cost of manufacturing the bicycle crankset. Also since these downshifting recesses or indentations are located adjacent the teeth, these downshifting recesses or indentations can also weaken the chain ring.

While these above-mentioned chains work well, it will be apparent to those skilled in the art from this disclosure that there exists a continual need for an outer chain link. This invention addresses this need in the art as well as other needs, which will become apparent to those skilled in the art from this disclosure.

SUMMARY OF THE INVENTION

One object of the present invention is to provide an outer chain link that can be used with a bicycle crankset having a large front chain ring that has no downshifting recesses or indentations are located adjacent the teeth or at least a shallower downshifting recesses or indentations as compared to prior bicycle crankset.

The foregoing objects can basically be attained by providing an outer chain link plate comprising first and second end portions and a connecting portion. The first and second end portions have at one least one pin coupling opening extending into the first and second end portions to define first and second pivot axes. The connecting portion connects the first and second end portions together with a longitudinal axis bisecting the least one pin coupling opening. The first and second end portions and the connecting portion define an outer peripheral edge. The at least one of the first and second end portions includes a side surface with a chamfered outer edge portion that extends along a section of the outer peripheral edge, and a first reduced area part that has a reduced radial dimension with respect to a radial dimension of a portion lying along the longitudinal axis. The radial dimensions are measured radially from an edge of the least one pin coupling opening to the outer peripheral edge along a line that extends from a corresponding one of the first and second pivot axes.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 12 is a longitudinal cross sectional view of the outer link plate illustrated in FIGS. 7 to 11 as seen along section line 12-12 of FIG. 9 in accordance with the first embodiment of the present invention;

FIG. 13 is a transverse cross sectional view of the outer link plate illustrated in FIGS. 7 to 11 as seen along section line 13-13 of FIG. 9 in accordance with the first embodiment of the present invention;

FIG. 14 is a transverse cross sectional view of the outer link plate illustrated in FIGS. 7 to 11 as seen along section line 14-14 of FIG. 10 in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
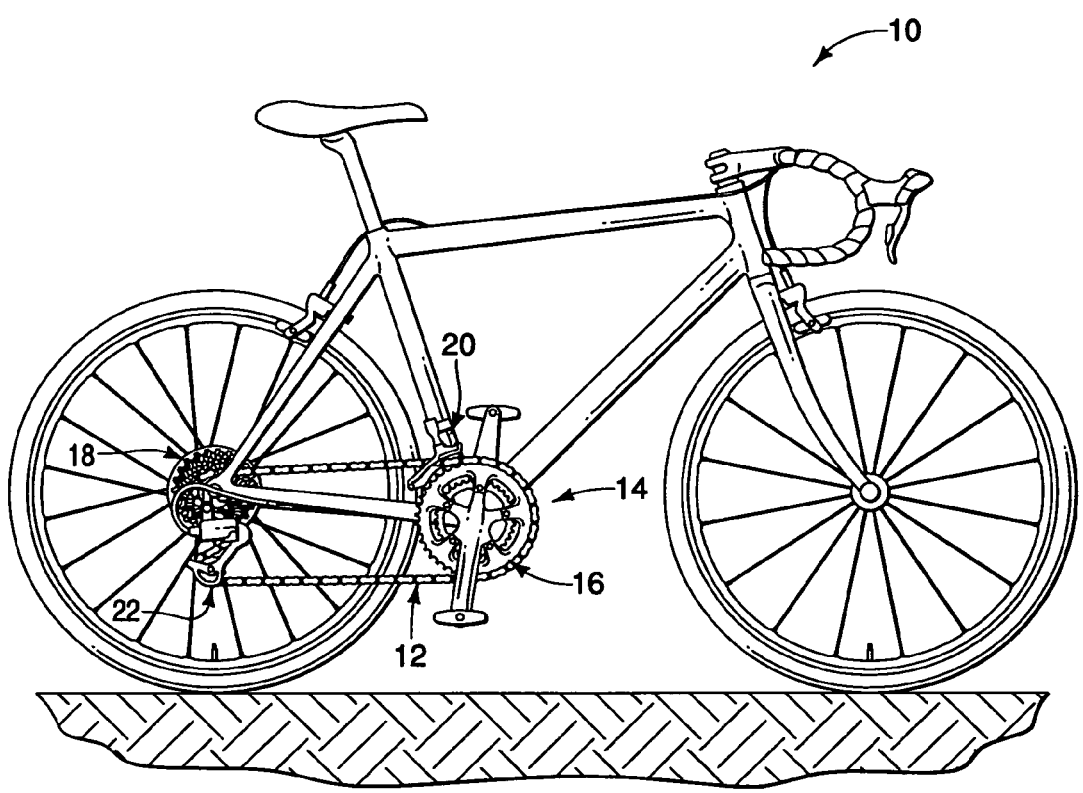
FIG. 1 is a side elevational view of a bicycle having a drive train that uses a bicycle chain having outer link plates in accordance with one embodiment of the present invention.

Referring initially to FIG. 1, a bicycle 10 is illustrated that uses a bicycle chain 12 in accordance with a first embodiment of the present invention. The bicycle 10 includes, among other things, a drive train 14 that is configured to convert the rider's pedaling force into driving force. The chain 12 is part of the drive train 14. The drive train 14 also includes a front crankset 16, a rear sprocket assembly 18, a front derailleur 20 and a rear derailleur 22. The crankset 16 is mounted on a bottom bracket that is secured in a hanger on the bicycle frame in a conventional manner. The rear sprocket assembly 18 is mounted to a free wheel of the rear wheel in a conventional manner. The chain 12 is arranged on the crankset 16 and the rear sprocket assembly 18 so as to extend therebetween in a conventional manner. The derailleurs 20 and 22 are configured and arranged to change gears by shifting the chain 12 in a lateral direction of the bicycle 10 in a conventional manner.

Figure 2:
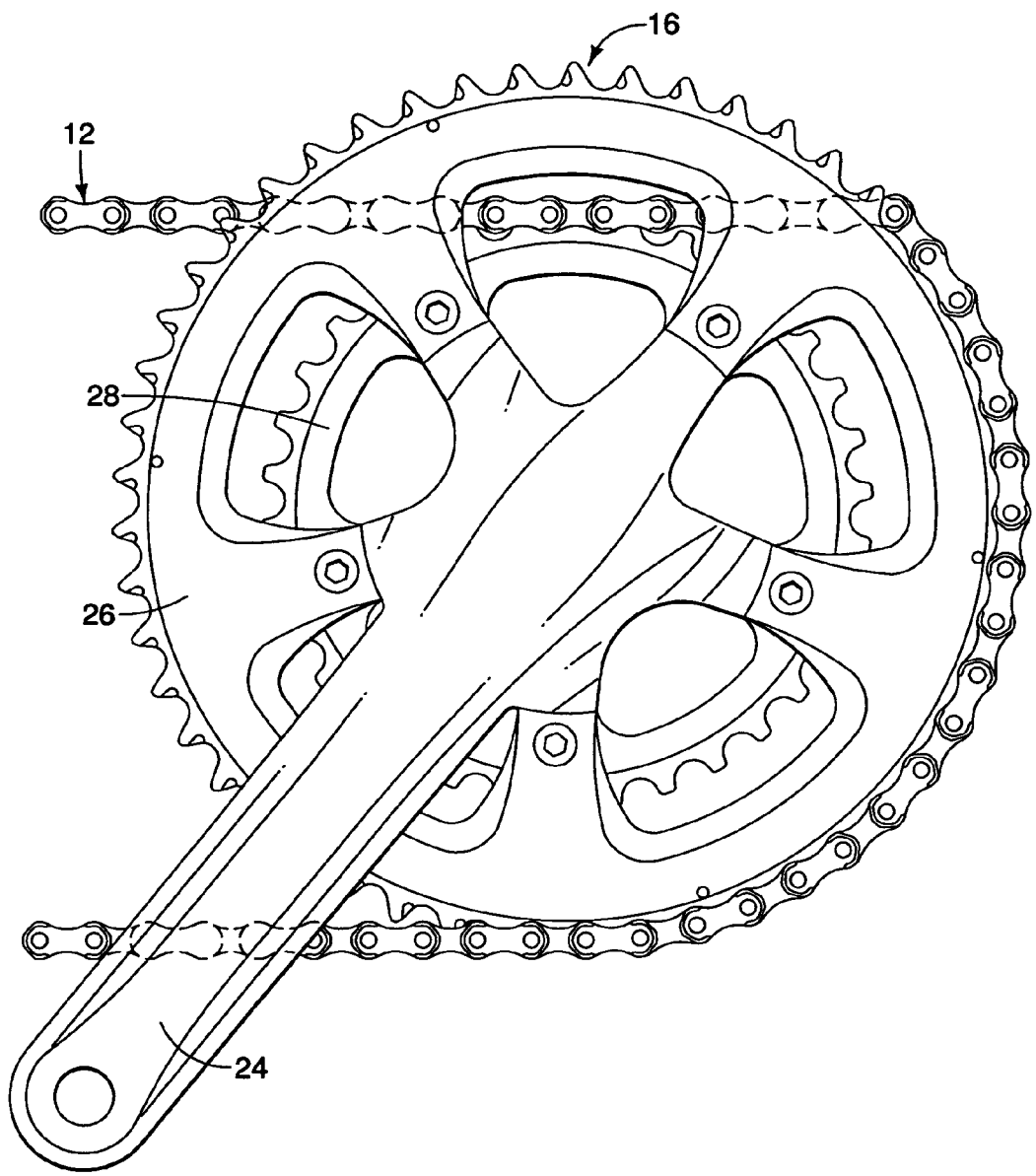
FIG. 2 is an enlarged side elevational view of a front bicycle crankset in which the bicycle chain is being down shifted from the large outer chain ring to the smaller inner chain ring in accordance with one embodiment of the present invention.

Referring now to FIG. 2, the right side of the front crankset 16 will be briefly described. The right side of the front crankset 16 basically includes a right crank arm (gear crank) 24 with an outer chain ring 26 and an inner chain ring 28. The front crankset 16 can be any known construction, and thus, will not be discussed and/or illustrated in detail herein. However, as explained below, the chain 12 of the present invention allows the outer chain ring 26 to be configured without deep downshifting recesses or indentions, and more preferably, to be configured without any downshifting recesses or indentions as shown.

Figure 3:
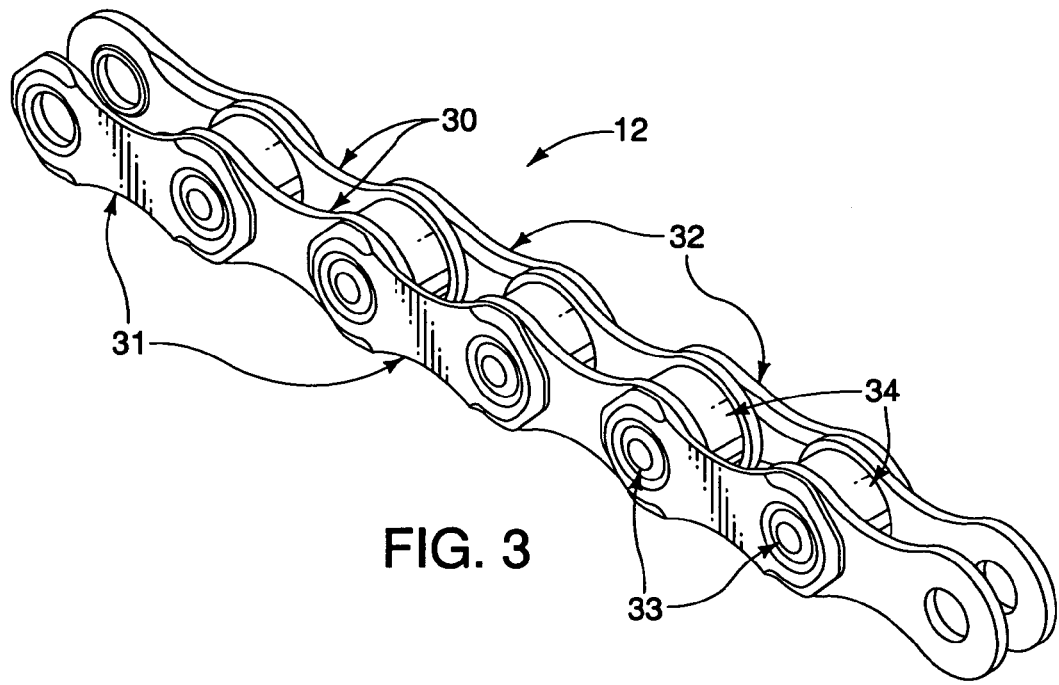
FIG. 3 is a perspective view of the bicycle chain equipped with the outer chain links in accordance with the present invention.
Figure 4:
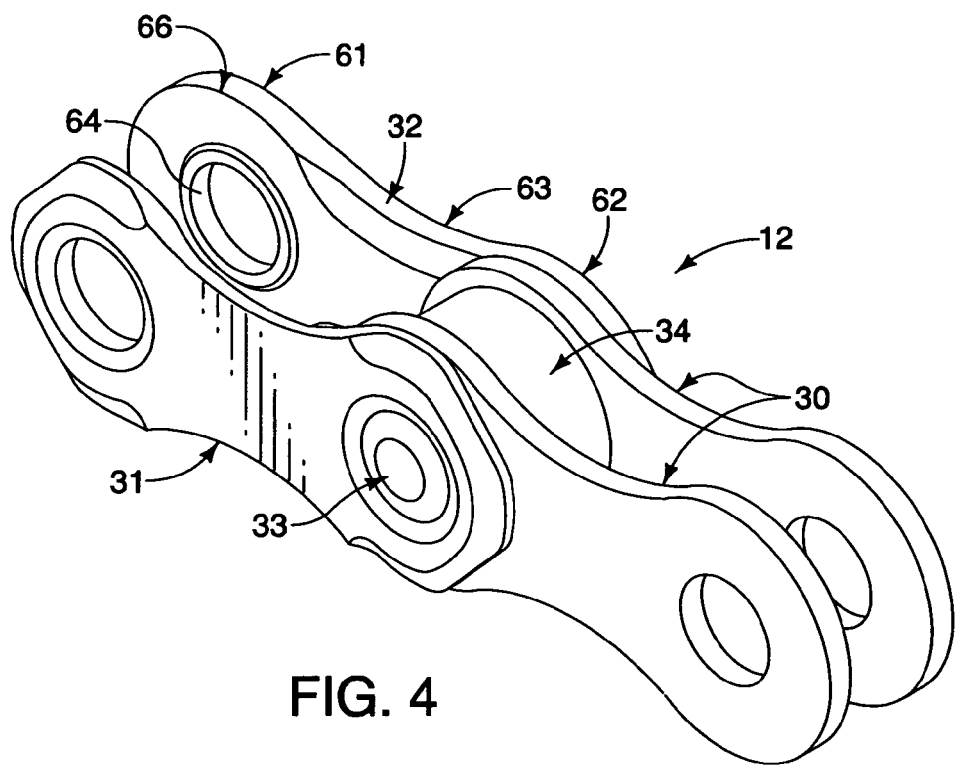
FIG. 4 is an enlarged perspective view of a portion of the bicycle chain illustrated in FIG. 3 in accordance with the first embodiment of the present invention.

Referring now to FIGS. 3 and 4, the chain 12 basically includes a plurality of inner link plates 30, a plurality of first outer link plates 31, a plurality of second outer link plates 32, a plurality of pins or rivets 33 and a plurality of rollers 34. The inner links 30 are interconnected in an alternating manner with the outer links 31 and 32 by the link pins 33 in a conventional manner. A master chain link (not shown) preferably interconnects two pairs of the inner plates 30 together so as to form a single continuous loop. The link plates 30 to 33, the link pins 33 and the rollers 34 are metal parts that are well known in the bicycle chain field. Thus, the inner plates 30, the link pins 33 and the rollers 34 are well known structures, and thus, they will not be discussed and/or illustrated in detail herein. Moreover, these parts can vary as needed and/or desired. For example, while the link pins 33 are illustrated as solid cylinders with a recess at each end so that the pins can be easily deformed that are deformed at each end, the link pins 33 can be hollow pins if needed and/or desired.

Referring now to FIGS. 4 to 15, the first and second outer link plates 31 and 32 will now be discussed in greater detail. When one of the first outer link plates 31 is coupled to one of the second outer link plates 32 by a pair of the link pins 33, an outer chain link is formed. First, each of the first outer link plates 31 has been modified relative to a conventional outer link plate so that the first outer link plates 31 minimize contact with the outer chain ring 26 during a downshifting operation. Second, each of the second outer link plates 32 is preferably a conventional outer link plate. However, the second outer link plates 32 can be made to be identical to the first outer link plates 31 or can be made to include some of the features of the first outer link plates 31.

Figure 8:
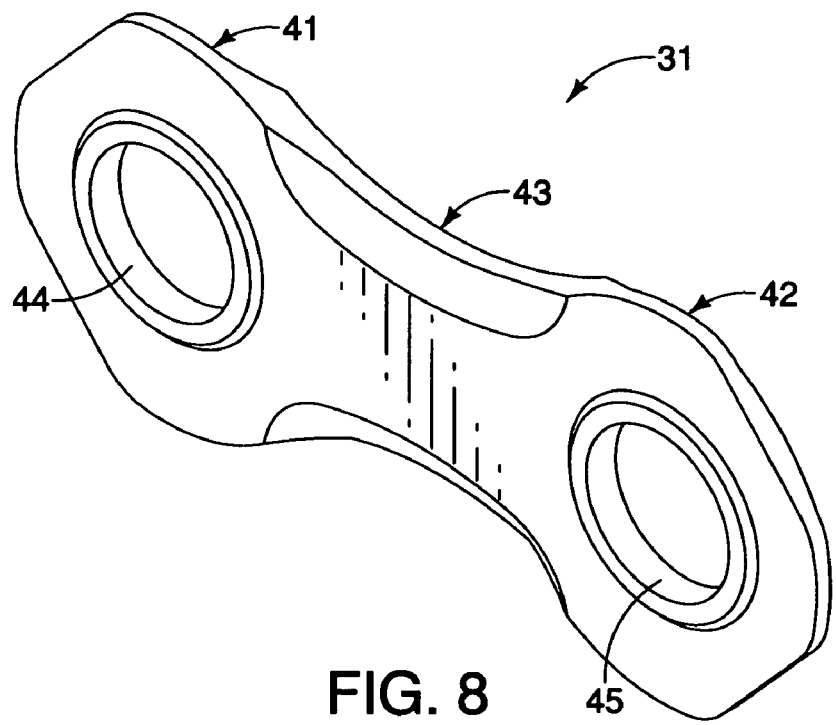
FIG. 8 is an inside perspective view of the outer link plate illustrated in FIG. 7 in accordance with the first embodiment of the present invention.
Figure 10:
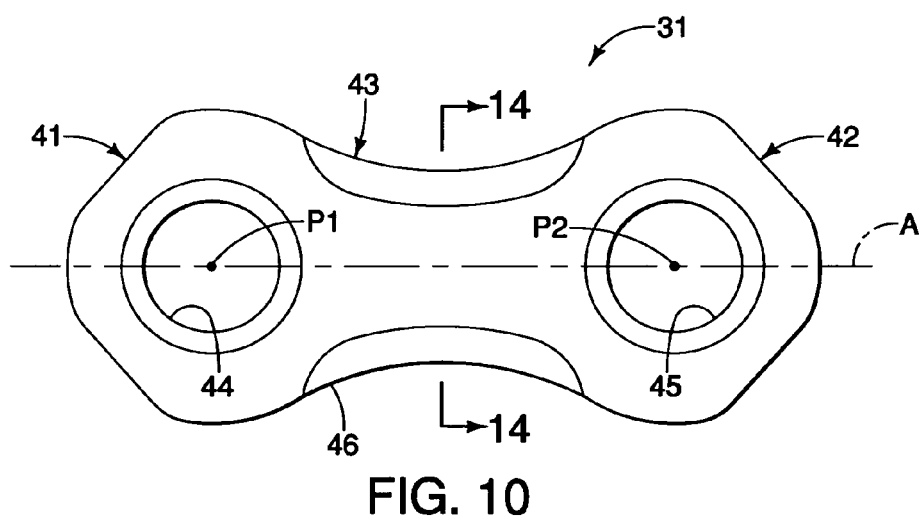
FIG. 10 is an inside elevational view of the outer link plate illustrated in FIGS. 7 to 9 in accordance with the first embodiment of the present invention.
Figure 11:
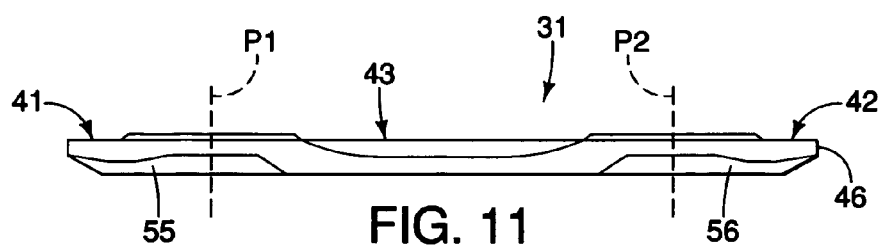
FIG. 11 is an edge view of the outer link plate illustrated in FIGS. 7 to 10 in accordance with the first embodiment of the present invention.

Now referring now to FIGS. 8 and 10, each of the first outer link plates 31 includes a first end portion 41, a second end portion 42 and a connecting portion 43 interconnecting the first and second end portions 41 and 42. The portions 41 to 43 of each of the first outer link plates 31 are preferably formed as a one-piece, unitary member from a hard, rigid material such as a metallic material that is known to be used for manufacturing bicycle chains. Also the first end portion 41 also has a pin hole 44 for receiving one of the link pins 33 therein. Likewise, the second end portion 42 also has a pin hole 45 for receiving one of the link pins 33 therein. The ends of the link pins 33 are deformed for fixedly securing the first and second outer link plates 31 and 32 thereto. The pin holes 44 and 45 have center points that define first and second pivot axes P1 and P2. A longitudinal axis A of the first and second outer link plates 31 and 32 bisects the connecting portion 43 and the pin holes 44 and 45, i.e., passes through the pivot axes P1 and P2 of the pin holes 44 and 45. While the pin holes 44 and 45 are illustrated as two separate and distinct pin holes constituting a first coupling hole and a second coupling hole, it will be apparent two those skilled in the art form this disclosure that a single elongated slot could be used to define the pin holes 44 and 45. Thus, the term "coupling opening"

should not be limited to a continuous circular hole that extends 360 degrees. Also while the connecting portion 43 is illustrated as being narrower than the first and second end portions 41 and 42, it will become apparent to those skilled in the art from this disclosure that the connecting portion 43 can be equal to the widths of the first and second end portions 41 and 42, if needed and/or desired.

Figure 9:
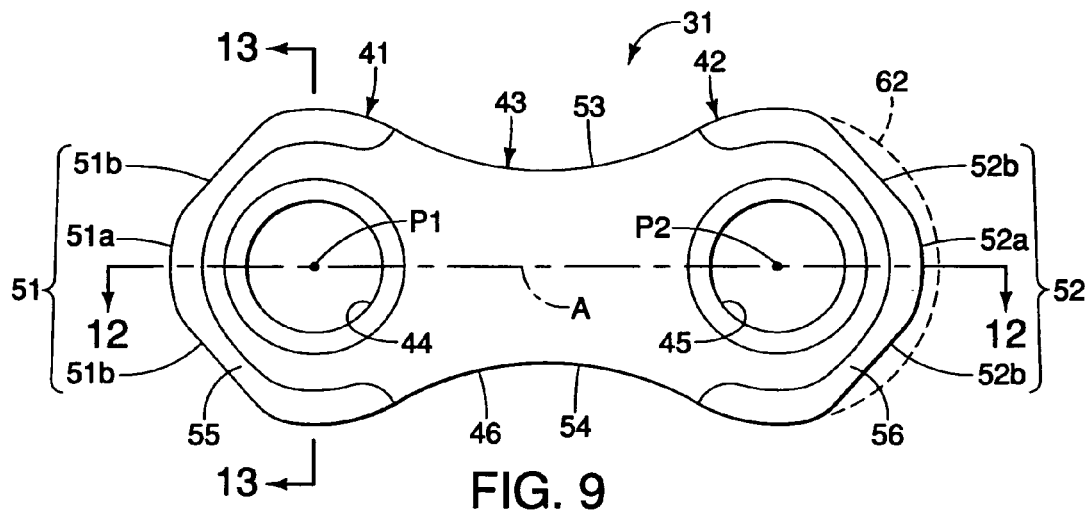
FIG. 9 is an outside elevational view of one of the outer link plates illustrated in FIGS. 7 and 8 in accordance with the first embodiment of the present invention.
Figure 15:
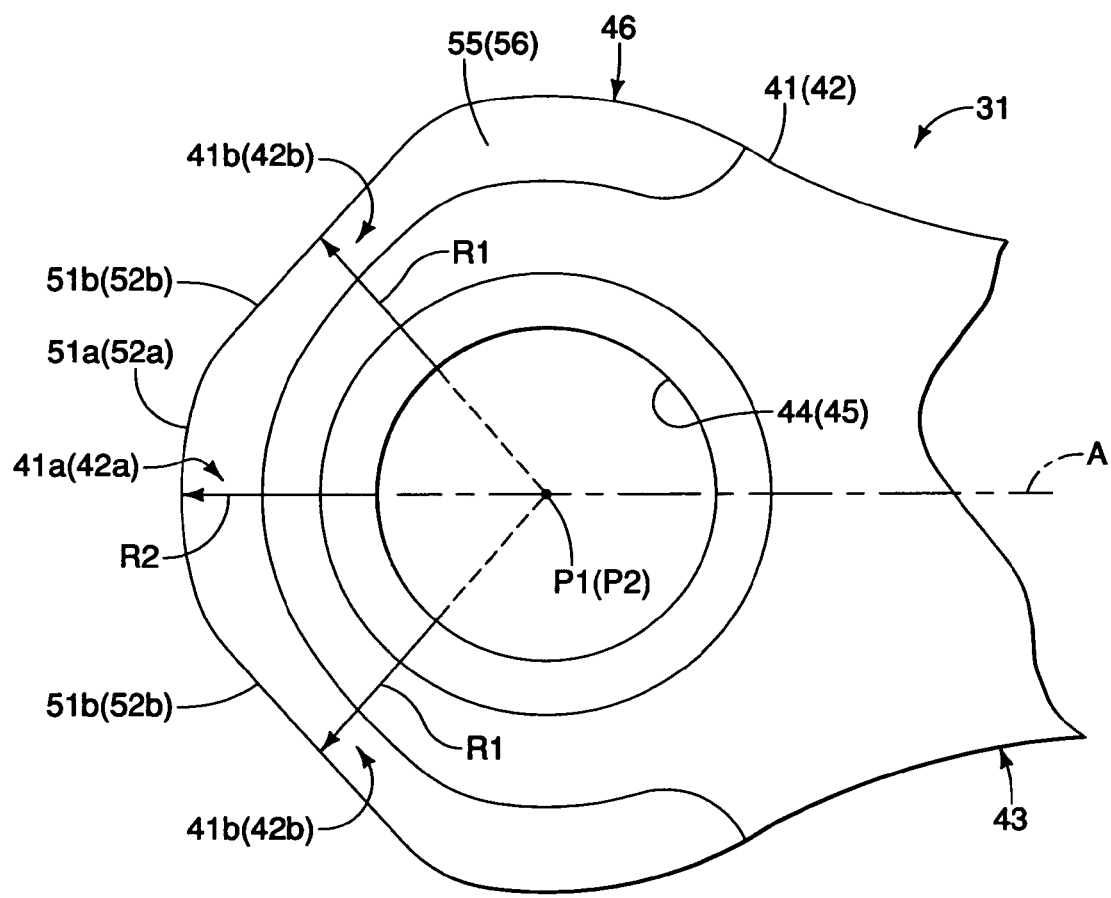
FIG. 15 is an enlarged elevational view of a portion of the outer link plate illustrated in FIGS. 7 to 11 in accordance with the first embodiment of the present invention.
Figure 16:
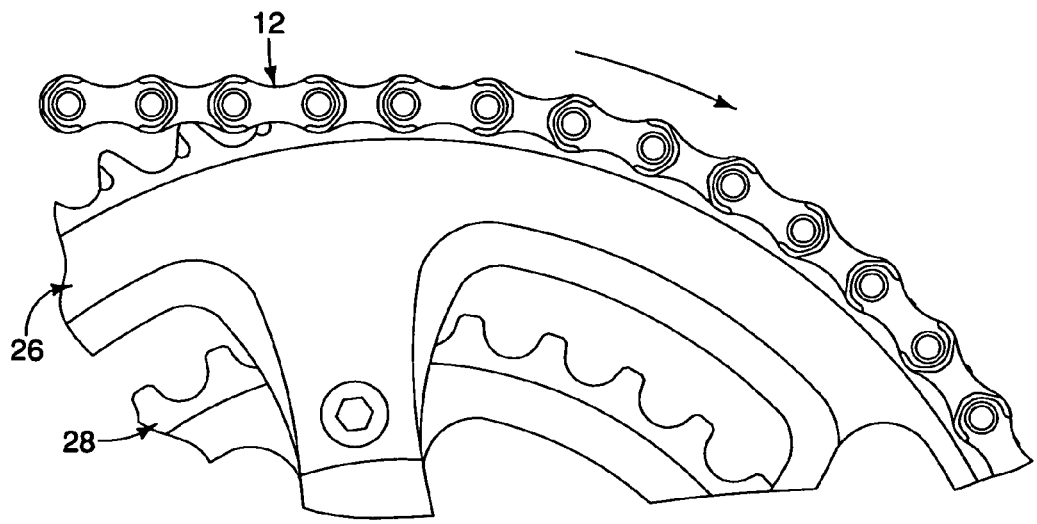
FIG. 16 is an enlarged outside elevational view of a portion of the front bicycle crankset with the chain on the outer chain ring.
Figure 17:
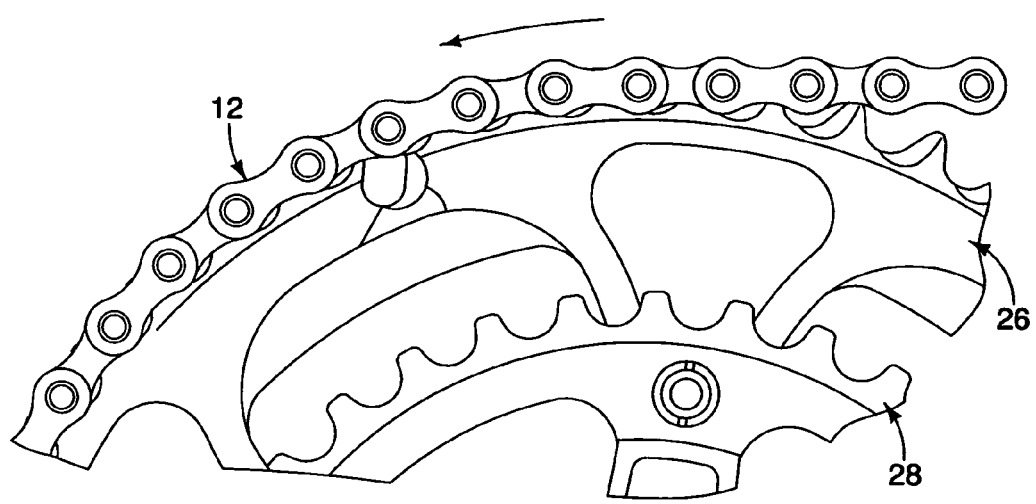
FIG. 17 is an enlarged inside elevational view of a portion of the front bicycle crankset with the chain on the outer chain ring.
Figure 18:
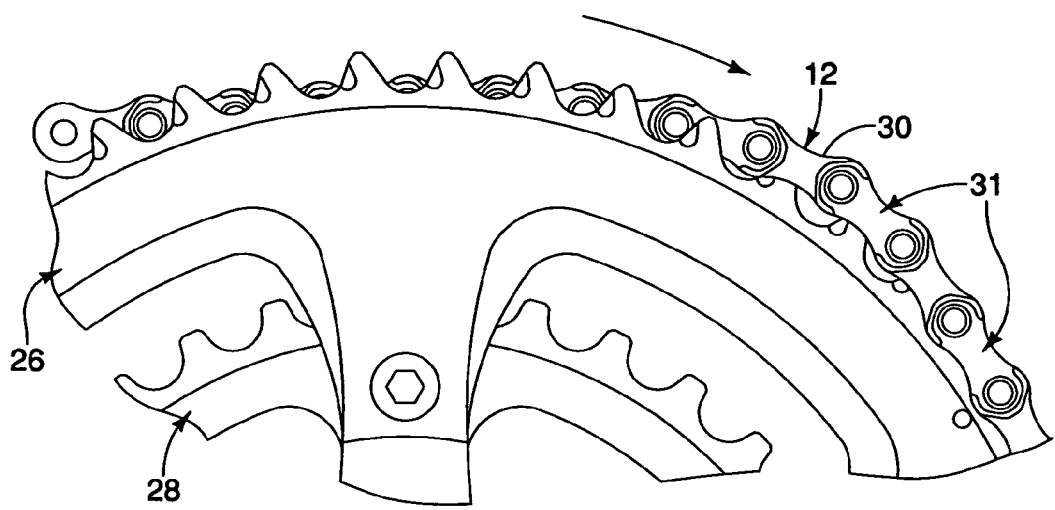
FIG. 18 is an enlarged outside elevational view of a portion of the front bicycle crankset with the chain being moved laterally off of the outer chain ring.
Figure 19:
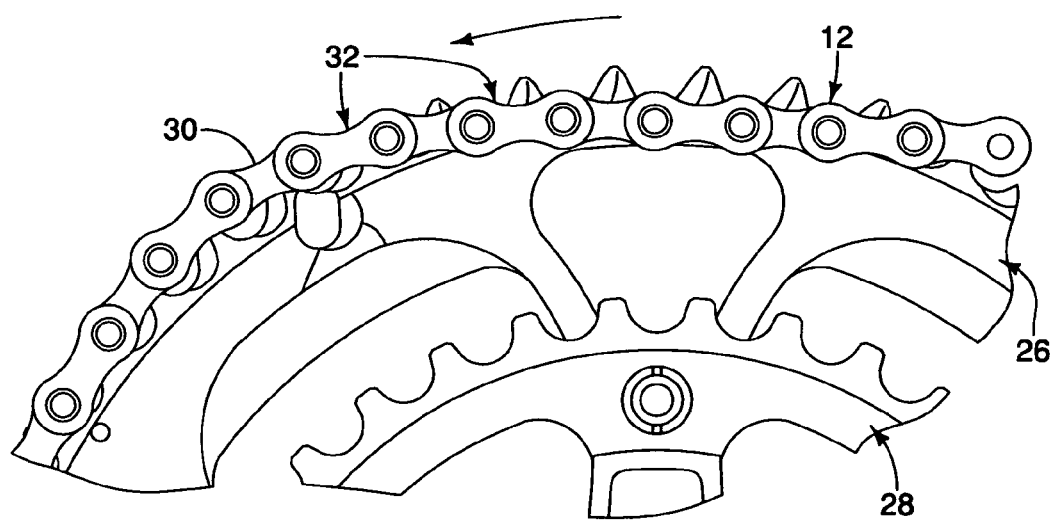
FIG. 19 is an enlarged inside elevational view of a portion of the front bicycle crankset with the chain being moved laterally off of the outer chain ring.
Figure 20:
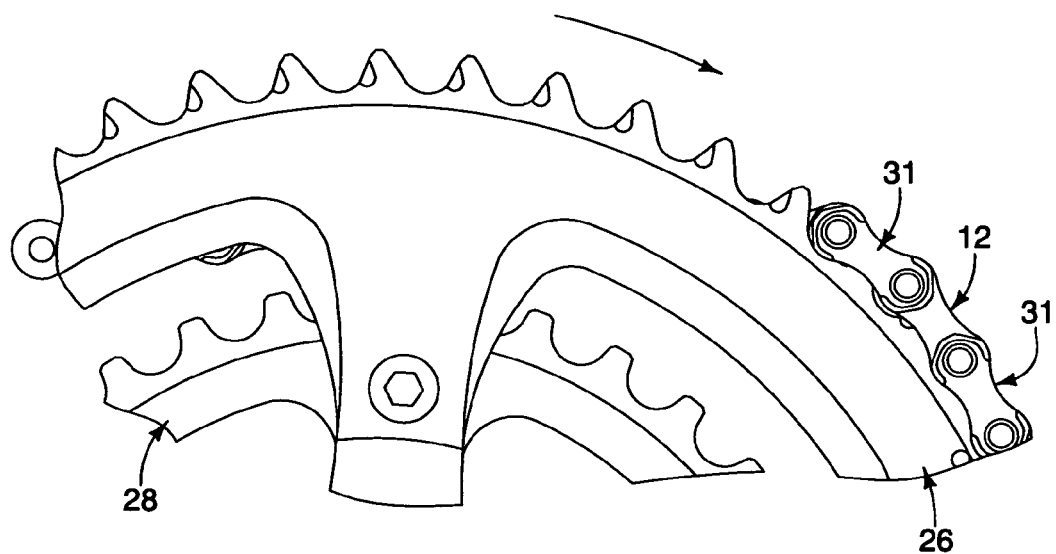
FIG. 20 is an enlarged outside elevational view of a portion of the front bicycle crankset with the chain being moved laterally off of the outer chain ring, but just prior to engagement with the inner chain ring.
Figure 21:
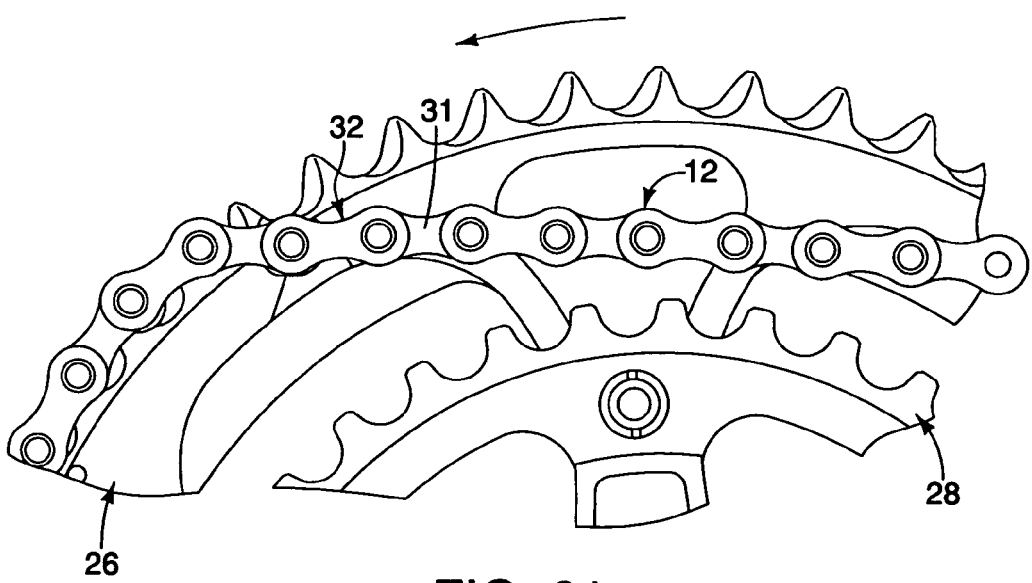
FIG. 21 is an enlarged inside elevational view of a portion of the front bicycle crankset with the chain being moved laterally off of the outer chain ring, but just prior to engagement with the inner chain ring.
Figure 22:
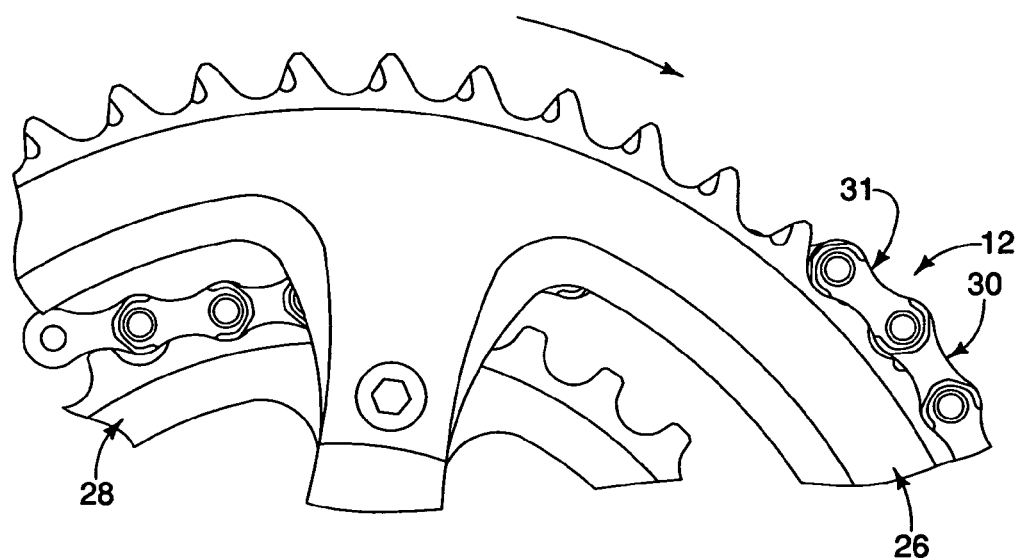
FIG. 22 is an enlarged outside elevational view of a portion of the front bicycle crankset with the chain being moved laterally off of the outer chain ring, just prior after engagement with the inner chain ring.
Figure 23:
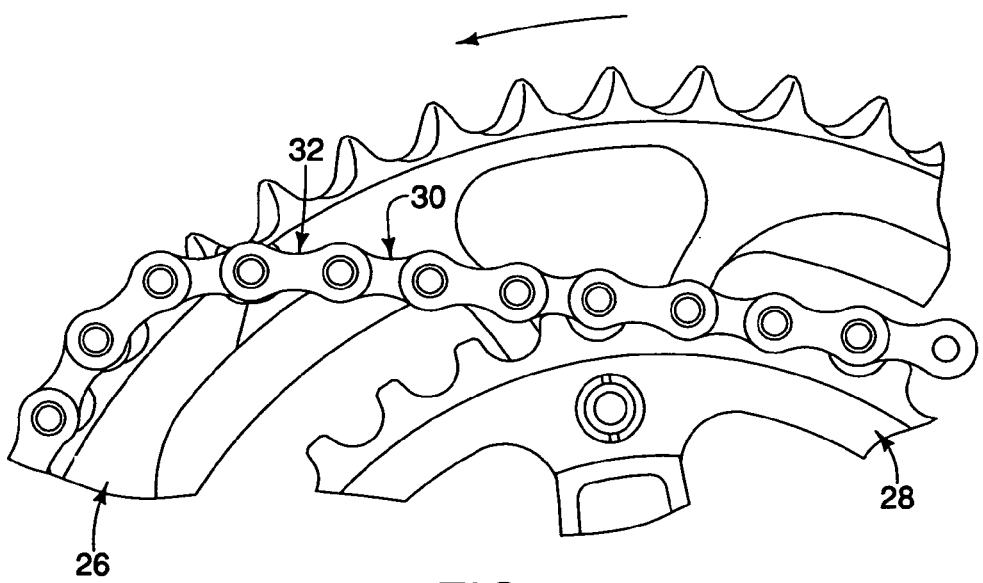
FIG. 23 is an enlarged inside elevational view of a portion of the front bicycle crankset with the chain being moved laterally off of the outer chain ring, just prior after engagement with the inner chain ring.
Figure 24:
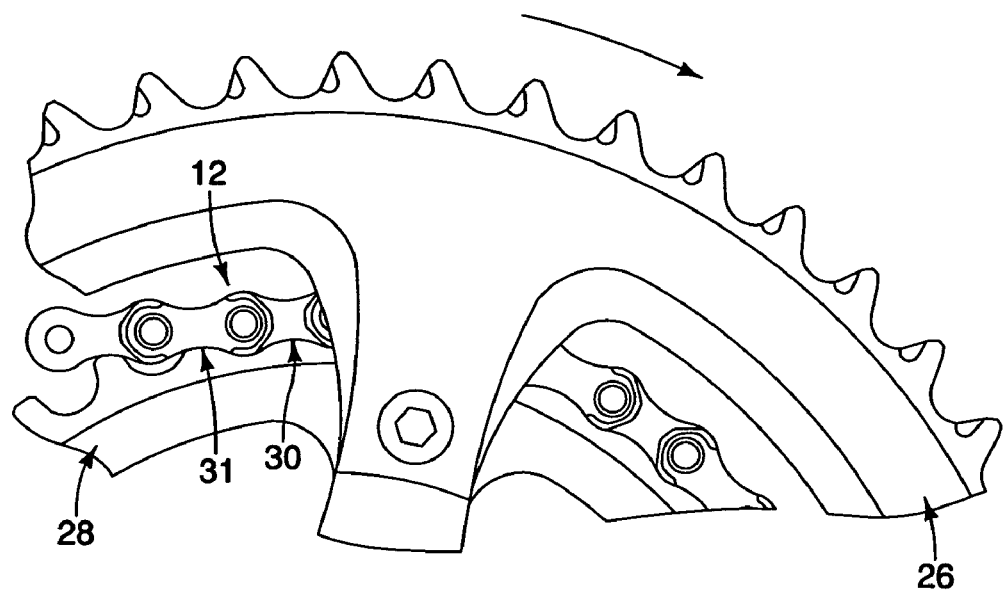
FIG. 24 is an enlarged outside elevational view of a portion of the front bicycle crankset with the chain completely transferred to the inner chain ring.
Figure 25:
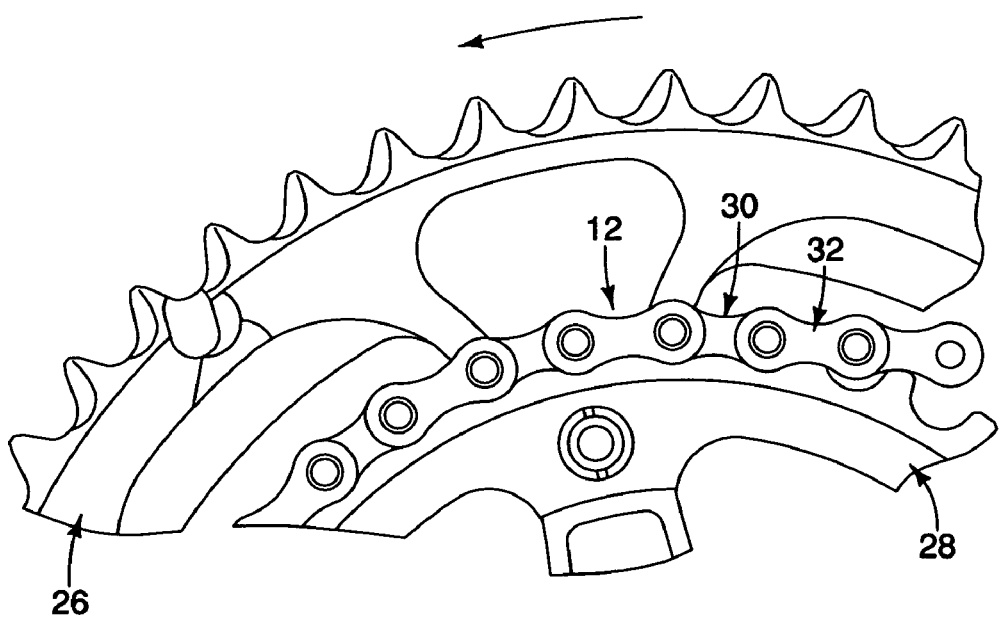
FIG. 25 is an enlarged inside elevational view of a portion of the front bicycle crankset with the chain completely transferred to the inner chain ring.

Referring now to FIGS. 9 and 15, the first and second end portions 41 and 42 and the connecting portion 43 of the first outer link plate 31 define a first outer peripheral edge 46 located between opposite side surfaces of the first outer link plate 31. The first outer peripheral edge 46 includes a first end edge section 51, a second end edge section 52 and a pair of central edge sections 53 and 54. The first end edge section 51 extends about the first end portion 41 of the first outer link plate 31. The second end edge section 52 extends about the second end portion 42 of the first outer link plate 31. The central edge sections 53 and 54 extend along the connecting portion 43 of the first outer link plate 31 between the first and second end portions 41 and 42 of the first outer link plate 31.

Figure 5:
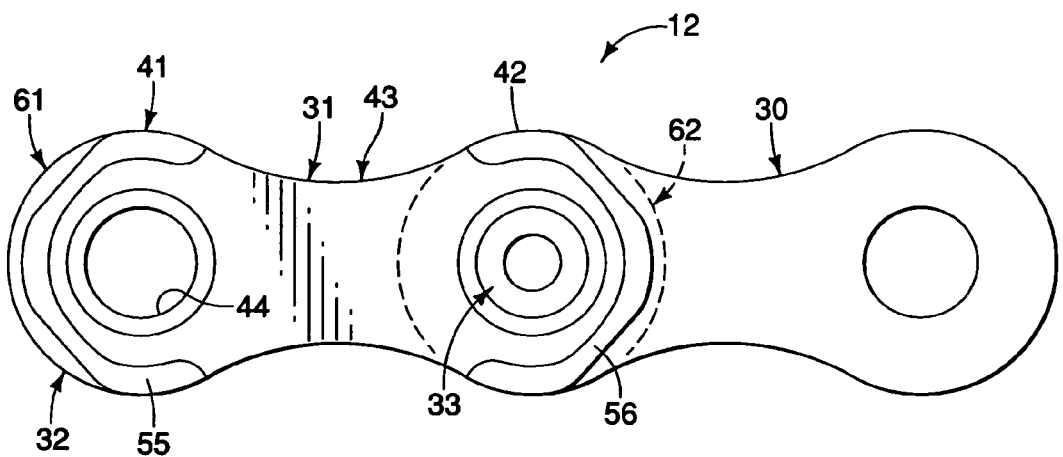
FIG. 5 is an outside elevational view of the portion of the bicycle chain illustrated in FIG. 4 in accordance with the first embodiment of the present invention.
Figure 6:
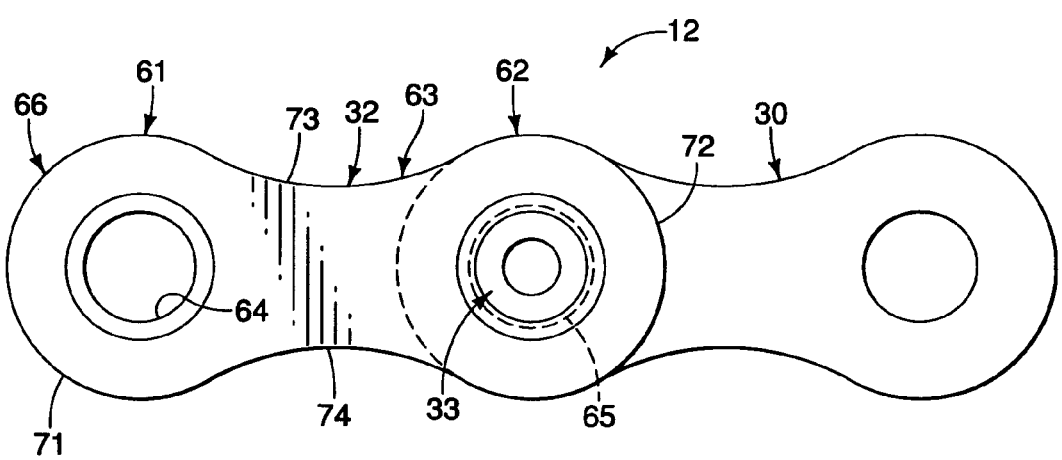
FIG. 6 is an inside elevational view of the portion of the bicycle chain illustrated in FIGS. 4 and 5 in accordance with the first embodiment of the present invention.
Figure 7:
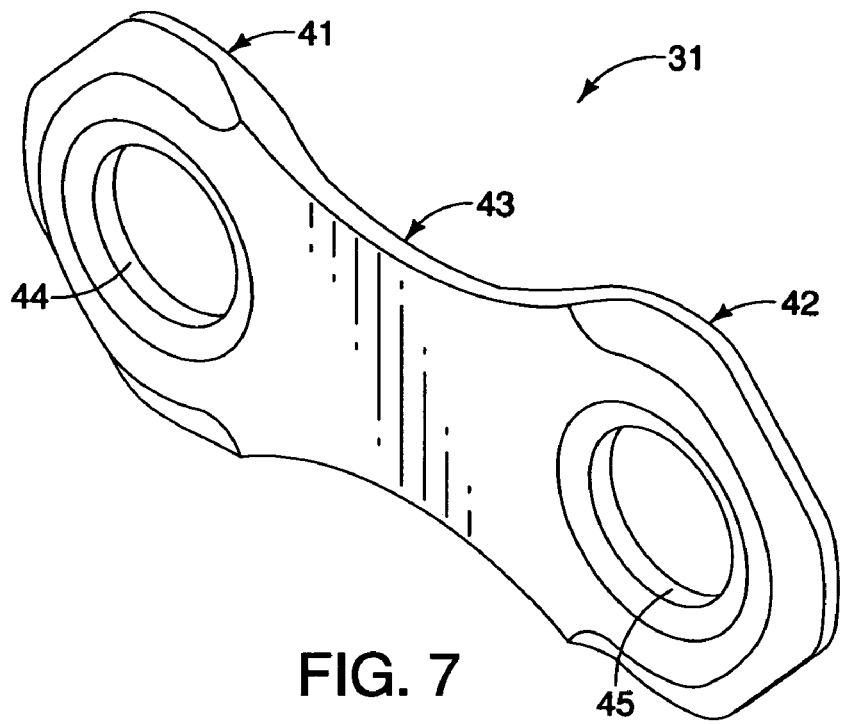
FIG. 7 is an outside perspective view of one of the outer link plates illustrated in FIGS. 3 to 5 in accordance with the first embodiment of the present invention.

As best seen in FIGS. 5 and 9, the first and second end portions 41 and 42 are smaller than the corresponding parts of the second outer link plate 32. The configurations of the first and second end portions 41 and 42 of the first outer link plates 31 allow for a small clearance to occur between the teeth of the outer chain ring 26 and the first and second end portions 41 and 42 of the first outer link plates 31 to aid in the downshifting movement of the chain 12. In other words, the configurations of the first and second end portions 41 and 42 of the first outer link plates 31 minimizes interference with the teeth of the outer chain ring 26 during the downshifting movement of the chain 12. The first and second end portions 41 and 42 are preferably mirror images of each other. However, the first and second end portions 41 and 42 can be slightly different with first and second end portions 41 and 42 only being the mirror images of each other with respect to portions of the outer peripheral edge. In any event, since the first and second end portions 41 and 42 are mirror images of each other in the illustrated embodiment, only one of the first and second end portions 41 and 42 will be discussed in detail herein.

The first end portion 41 is provided with a chamfered (beveled) outer edge portion 55 that extends along a majority of the first end edge section 51 of the first outer peripheral edge 46, while the second end portion 42 is provided with a chamfered (beveled) outer edge portion 56 that extends along a majority of the second end edge section 52 of the first outer peripheral edge 46. The chamfered outer edge portions 55 and 56 are symmetrically arranged about the longitudinal axis A. Preferably, the chamfered outer edge portions 55 and 56 extend at least 180 degrees about their corresponding one of the pivot axes P1 and P2. More preferably, the chamfered outer edge portions 55 and 56 extend at least 240 degrees about their corresponding one of the pivot axes P1 and P2. The chamfered outer edge portions 55 and 56 are dimensioned such that the portion of the chain 12 located between the outer chain ring 26 and the inner chain ring 28 minimizes interference with the inside face of the outer chain ring 26 and/or the adjacent tooth of the outer chain ring 26 during the downshifting movement of the chain 12.

As best seen in FIG. 15, the first and second end edge sections 51 and 52 of the first outer peripheral edge 46 of the first and second end portions 41 and 42 are non-semicircular about the longitudinal axis A. The first end edge section 51 of the first outer peripheral edge 46 includes a middle part 51a located at the longitudinal axis A and a pair of flat parts 51b extending from the middle edge part 51a. Likewise, the second end edge section 52 of the first outer peripheral edge 46 includes a middle part 52a located at the longitudinal axis A and a pair of flat parts 52b extending from the middle edge part 52a. The middle edge parts 51a and 52a are preferably curved surfaces with their centers offset towards the middle of the first outer link plate 31 from their corresponding one of the pivot axes P1 and P2. The flat edge parts 51b are angled at ninety-five degrees (i.e., substantially ninety degrees) apart relative to each other about the longitudinal axis A. Likewise, the flat edge parts 52b are angled at ninety-five degrees (i.e., substantially ninety degrees) apart relative to each other about the longitudinal axis A. Thus, the first end portion 41 has a large area part 41a defined by the middle edge part 51a of the first outer peripheral edge 46 located at the longitudinal axis A and a pair of reduced area parts 41b defined by the flat edge parts 51b of the first outer peripheral edge 46. Similarly, the second end portion 42 has a large area part 42a defined by the middle edge part 52a of the first outer peripheral edge 46 located at the longitudinal axis A and a pair of reduced area parts 42b defined by the flat edge parts 52b of the first outer peripheral edge 46. In particular, the reduced area parts 41b and 42b have reduced radial dimension R1 with respect to radial dimensions R2 of the middle edge parts 51a and 52a (i.e., the portions of the first and second end portions 41 and 42 that lie along the longitudinal axis. These radial dimensions R1 and R2 are measured radially from an edge of their corresponding one of the pin holes 44 and 45 to the outer peripheral edge along a line that extends from a corresponding one of the first and second pivot axes P1 and P2.

While the first outer link plates 31 are illustrated as being symmetrical about the longitudinal axis A and the first and second end portions 41 and 42 being mirror images of each other, the first outer link plates 31 can be configured such that the reduced area part and the chamfered outer edge portion are only disposed along a bottom area of the outer peripheral edge that faces a center axis of the outer chain ring 26 when in use.

As best seen in FIGS. 4 and 5, the first and second end portions 41 and 42 are smaller than the corresponding parts of the second outer link plate 32. The configurations of the first and second end portions 41 and 42 of the first outer link plates 31 allow for a small clearance to occur between the teeth of the outer chain ring 26 and the first and second end portions 41 and 42 of the first outer link plates 31 to aid in the downshifting movement of the chain 12. In other words, the configurations of the first and second end portions 41 and 42 of the first outer link plates 31 minimizes interference with the teeth of the outer chain ring 26 during the downshifting movement of the chain 12.

Similar to the first outer link plates 31, each of the second outer link plates 32 includes a first end portion 61, a second end portion 62 and a connecting portion 63 interconnecting the first and second end portions 61 and 62. However, the first and second end portions 61 and 62 are larger than the first and second end portions 41 and 42 of the first outer link plate 31. The portions 61 to 63 of each of second outer link plates 32 are preferably formed as a one-piece, unitary member from a hard, rigid material such as a metallic material that is known to be used for manufacturing bicycle chains. Also the first end portion 61 also has a pin hole 64 for receiving one of the link pins 33 therein. Likewise, the second end portion 62 also has a pin hole 65 for receiving one of the link pins 33 therein. The ends of the link pins 33 are deformed for fixedly securing the first and second outer link plates 31 and 32 thereto. In other words, a first one of the link pins 33 connects the first end portions 41 and 61 of the first and second link plates 31 and 32 together, and a second one of the link pins 33 connects the second end portions 42 and 62 of the first and second link plates 31 and 32 together.

Referring again to FIGS. 4 and 5, the first and second end portions 61 and 62 and the connecting portion 63 of the second outer link plate 32 define a second outer peripheral edge 66 located between opposite side surfaces of the second outer link plate 32. The second outer peripheral edge 66 includes a first end edge section 71, a second end edge section 72 and a pair of central edge sections 73 and 74. The first end edge section 71 extends about the first end portion 61 of the second outer link plate 32. The second end edge section 72 extends about the second end portion 62 of the second outer link plate 32. The central edge sections 73 and 74 extend along the connecting portion 63 of the second outer link plate 32 between the first and second end portions 61 and 62 of the second outer link plate 32.

As best seen in FIGS. 4 and 5, the first and second end edge sections 71 and 72 of the first and second end portions 61 and 62 are at least semicircular, and more preferably extend 240 degrees along a singe arc. Thus, the overall shape of the first and second end portions 61 and 62 is larger than the first and second end portions 41 and 42 of the first outer link plates 31. The term "semicircular" as used herein refers to an arc that is equal one half of a circle.

Thus, the first and second end edge sections 71 and 72 of the second outer peripheral edge 66 of the first and second end portions 61 and 62 are dimensioned such that the overall length of the second outer link plates 32 is approximately 0.6 millimeters longer than the first outer link plates 31 for a conventional bicycle chain.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with a chain of the present invention. Accordingly, these terms, as utilized to describe the present invention should be interpreted relative to a bicycle equipped with a chain of the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An outer chain link comprising:
a first link plate including first and second end portions and a connecting portion interconnecting the first and second end portions of the first link plate;
a second link plate including first and second end portions and a connecting portion interconnecting the first and second end portions of the second link plate, respectively:
a first link pin connecting the first end portions of the first and second link plates together; and
a second link pin connecting the second end portions of the first and second link plates together,
the first and second end portions and the connecting portion of the first link plate defining a first outer peripheral edge located between opposite side surfaces of the first link plate, with the first outer peripheral edge including a first end edge section extending about the first end portion of the first link plate, a second end edge section extending about the second end portion of the first link plate and a pair of central edge sections extending along the connecting portion of the first link plate between the first and second end portions of the first link plate,
the first and second end portions and the connecting portion of the second link plate defining a second outer peripheral edge located between opposite side surfaces of the second link plate, with the second outer peripheral edge including a first end edge section extending about the first end portion of the second link plate, a second end edge section extending about the second end portion of the second link plate and a pair of central edge sections extending along the connecting portion of the second link plate between the first and second end portions of the second link plate,
the first end edge section of the first outer peripheral edge of the first end portion of the first link plate being dimensioned such that at least a part of the first end edge section of the first outer peripheral edge of the first end portion of the first link plate is disposed closer to the first link pin than a corresponding part of the first end edge section of the second outer peripheral edge of the first end portion of the second link plate,
the first end edge section of the first end portion of the first link plate being non-semicircular, and the first end edge section of the first end portion of the second link plate being semicircular,
the at least a part of the first end edge section of the first outer peripheral edge of the first end portion of the first link plate being disposed closer to the first link pin at a longitudinal axis of the first link plate than the corresponding part of the first end edge section of the second outer peripheral edge of the first end portion of the second link plate at a longitudinal axis of the second link plate.

2. The outer chain link according to claim 1, wherein the first end portion of the first link plate has a first side surface including a chamfered outer edge portion extending along the first end edge section of the first outer peripheral edge of the first end portion of the first link plate.

3. The outer chain link according to claim 2, wherein the chamfered outer edge portion extends at least 180 degrees about the first end portion adjacent the first end edge section of the first outer peripheral edge of the first end portion of the first link plate.

4. An outer chain link comprising:

a first link plate including first and second end portions and a connecting portion interconnecting the first and second end portions of the first link plate;

a second link plate including first and second end portions and a connecting portion interconnecting the first and second end portions of the second link plate, respectively;

a first link pin connecting the first end portions of the first and second link plates together; and a second link pin connecting the second end portions of the first and second link plates together, the first and second end portions and the connecting portion of the first link plate defining a first outer peripheral edge located between opposite side surfaces of the first link plate, with the first outer peripheral edge including a first end edge section extending about the first end portion of the first link plate, a second end edge section extending about the second end portion of the first link plate and a pair of central edge sections extending along the connecting portion of the first link plate between the first and second end portions of the first link plate, the first and second end portions and the connecting portion of the second link plate defining a second outer peripheral edge located between opposite side surfaces of the second link plate, with the second outer peripheral edge including a first end edge section extending about the first end portion of the second link plate, a second end edge section extending about the second end portion of the second link plate and a pair of central edge sections extending along the connecting portion of the second link plate between the first and second end portions of the second link plate, the first end edge section of the first outer peripheral edge of the first end portion of the first link plate being dimensioned such that at least a part of the first end edge section of the first outer peripheral edge of the first end portion of the first link plate is disposed closer to the first link pin than a corresponding part of the first end edge section of the second outer peripheral edge of the first end portion of the second link plate, the first end edge section of the first outer peripheral edge of the first end portion of the first link plate including a middle edge part located at a longitudinal axis and a pair of flat edge parts extending from the middle edge part, the at least a part of the first end edge section of the first outer peripheral edge of the first end portion of the first link plate being disposed closer to the first link pin at the longitudinal axis of the first link plate than the corresponding part of the first end edge section of the second outer peripheral edge of the first end portion of the second link plate at a longitudinal axis of the second link plate.

5. The outer chain link according to claim 4, wherein the first end portion of the first link plate further includes at least one reduced area part that has a reduced radial dimension with respect to a radial dimension of a portion lying along the longitudinal axis.

6. The outer chain link according to claim 5, wherein the at least one reduced area part is disposed along a bottom area of the first outer peripheral edge that faces a center axis of a sprocket when in use.

7. The outer chain link according to claim 4, wherein the first and second end portions of the first and second link plates are, respectively, mirror images of each other with respect to respective portions of the first and second outer peripheral edges.

8. The outer chain link according to claim 4, wherein the first link plate includes two separate and distinct pin holes constituting a first coupling hole and a second coupling hole that receive the first and second link pins, respectively.

9. The outer chain link according to claim 4, wherein the middle edge part is a curved surface.

10. The outer chain link according to claim 4, wherein the flat edge parts are angled at substantially ninety degrees apart relative to each other about the longitudinal axis.

11. The outer chain link according to claim 4, wherein the flat edge parts are angled at ninety-five degrees apart relative to each other about the longitudinal axis.

12. The outer chain link according to claim 4, wherein the first end portion of the first link plate has a first side surface including a chamfered outer edge portion extending along at least one of the flat edge parts of the first end edge section of the first outer peripheral edge of the first end portion of the first link plate.

13. The outer chain link according to claim 12, wherein the chamfered outer edge portion extends at least 240 degrees about the first end portion adjacent the first end edge section of the first outer peripheral edge of the first end portion of the first link plate.

14. The outer chain link according to claim 4, wherein the chamfered outer edge portion extends at least 180 degrees about the first end portion adjacent the first end edge section of the first outer peripheral edge of the first end portion of the first link plate.

* * * * *